United States Patent
Humphreys

(10) Patent No.: US 6,206,437 B1
(45) Date of Patent: Mar. 27, 2001

(54) HOSE MALE FITTING

(75) Inventor: James W. Humphreys, Pentwater, MI (US)

(73) Assignee: Lakeshore Automatic Products, Inc., Grand Haven, MI (US)

( * ) Notice: Subject to any disclaimer, the term of this patent is extended or adjusted under 35 U.S.C. 154(b) by 0 days.

(21) Appl. No.: 09/218,464

(22) Filed: Dec. 22, 1998

(51) Int. Cl.$^7$ .................................................. F16L 17/00
(52) U.S. Cl. ........................................ 285/353; 285/382.5
(58) Field of Search ............................... 285/382, 382.2, 285/382.4, 382.5, 382.7, 258, 81; 29/507, 521, 522.1, 523

(56) References Cited

U.S. PATENT DOCUMENTS

| | | | |
|---|---|---|---|
| 3,787,945 | * | 1/1974 | Pasek ................................. 285/382.5 |
| 4,142,843 | * | 3/1979 | Kish .................................. 285/382.4 |
| 4,330,144 | * | 5/1982 | Ridenour ........................... 285/382.5 |
| 4,765,661 | * | 8/1988 | Fukushima ........................ 285/382.2 |
| 4,887,853 | * | 12/1989 | Flowers ............................. 285/382.4 |
| 4,902,048 | * | 2/1990 | Washizu ............................... 285/382 |
| 4,905,766 | * | 3/1990 | Dietz ................................. 285/382.4 |
| 5,484,174 | * | 1/1996 | Gotoh ................................ 285/382.2 |
| 5,586,791 | * | 12/1996 | Kirchner et al. ..................... 285/179 |

FOREIGN PATENT DOCUMENTS

WO 94/09305  *  4/1994  (GB) .................................... 285/258

* cited by examiner

Primary Examiner—Lynne H. Browne
Assistant Examiner—Aaron Dunwoody
(74) Attorney, Agent, or Firm—Price, Heneveld, Cooper, DeWitt & Litton

(57) ABSTRACT

A male hose connector of a threaded, machined metal male end, and a tubular stem metal stamping, the stem having a rim engaging an annular shoulder in the male end, an O-ring between the male end and rim, and an axial splined connection between the male end and stem.

5 Claims, 1 Drawing Sheet

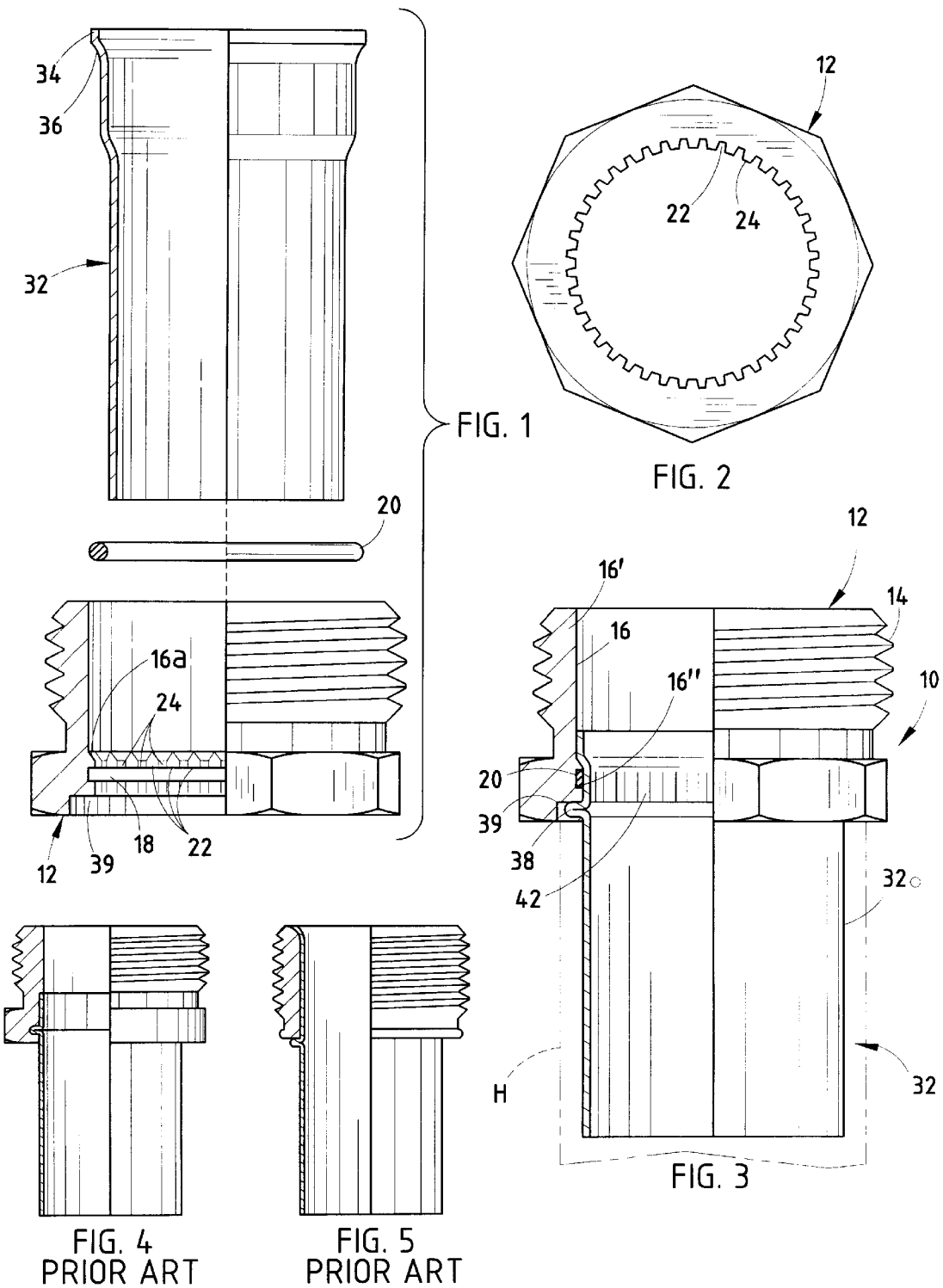

HOSE MALE FITTING

BACKGROUND OF THE INVENTION

This invention relates to a male hose connector for garden hoses.

Most hose female metal connectors are of machined components and therefore of high quality, crushproof character. However, many garden hose male metal connectors are either totally of low quality stamped components which are not crushproof, or are a combination of a machined crushproof male end and a stamped stem secured to the male end by soldering (FIG. 4) or crimping (FIG. 5). The soldered joint in the first type is intended to seal the joint against leakage. Unfortunately, the soldering procedure adds expense to the manufacturing operation. The crimped joint is intended to cause the outer end of the stamped liner to extend clear through the machined male end and contact the rubber washer in a connected female fitting to thereby seal against leakage. However, this extended crimped portion is clearly visible and creates a low quality impression to the potential purchaser.

SUMMARY OF THE INVENTION

The present invention provides a hose male metal connector employing a machined male end and an interconnected stamped stem in a novel fashion that produces a high quality product wherein the stem does not extend to the outer end of the male end and therefore is unnoticeable, yet has an effective seal to the male end. The stamped metal stem, preferably of brass, is crimped over an annular shoulder of the male end to prevent its axial retraction, is sealed to the male end by an internal O-ring, and has an axially splined inter-engagement to the male end to prevent rotation between these components.

BRIEF DESCRIPTION OF THE DRAWINGS

FIG. 1 is a partially sectioned exploded view of the male end and sleeve to be combined into the novel fitting;

FIG. 2 is an end elevational view of the male end of the novel fitting;

FIG. 3 is a partially sectioned, side elevational view of the assembled novel fitting;

FIG. 4 is a partially sectioned, side elevational view of one type of prior art fitting; and FIG. 5 is a partially sectioned, side elevational view of a second type of prior art fitting.

DESCRIPTION OF THE PREFERRED EMBODIMENT

Referring now specifically to the drawings, the male hose fitting 10 is depicted in FIG. 3 partially sectioned for purposes of clarity. The male hose fitting 10 comprises a machined metal male end 12 having male threads 14 on the exterior of one end, an inner periphery 16 defining a flow passageway therethrough including an axially outer end 16', and an axially inner end 16". An O-ring groove 18 is in the flow passageway, specifically in the inner periphery, to receive an O-ring 20. Astraddle O-ring groove 18, formed into inner end portion 16", are a plurality of axially extending, circumferentially spaced grooves 22. These preferably extend around 360° of the peripheral surface, being spaced by a plurality of axially extending ridges 24.

Cooperative with this machined male end is a tubular stem metal stamping sleeve which is generally cylindrical in its original form 32o (FIG. 3). The blank sleeve 32o includes one end 34 which is enlarged in diameter and an intermediate, annular, diagonal shoulder 36, to form a rim. When the sleeve is assembled to male end 12, rim shoulder 36 abuts against the transverse shoulder 16a of the inner periphery of male end 12. Alternatively, the rim may be formed in situ as by crimping or rolling after the sleeve has been inserted into the male end. The adjacent sleeve portion sealingly engages O-ring 20, as depicted in FIG. 3. Shoulder 36 aids in retaining the sleeve against withdrawal of the sleeve from the male end. In order to prevent the sleeve from falling out of the outer end of male end 12 through which it was inserted, it is crimped to form the radially outwardly extending annular collar 38 (FIG. 3) into an annular groove 39. Collar 38 is deformed into groove 39 as by a crimping die, preferably at the time of assembly of the fitting to a hose H (FIG. 3). The tubular stamping is die-rolled inside male end 12 to create depressions 42 of the tubular stock into grooves 22, to thereby form a splined inter-engagement between the two components and prevents rotation therebetween. Thus, tubular stamping 32 is therefore axially secured to the male end, is sealed by the O-ring, and is rotationally secured to the male end. When the connector is thus attached to a conventional hose, the tubular stock is not noticeable.

The above description is considered that of the preferred embodiments only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. A male hose connector comprising:

a machined metal male end having male threads on its exterior, an inner periphery defining a flow passageway therethrough including an axially outer end and an axially inner end;

an O-ring groove in said inner periphery and an O-ring in said O-ring groove;

a transverse annular shoulder in said flow passageway between said axially outer end and said O-ring groove;

a tubular stem metal sleeve having a cylindrical outer end for placement in a hose, and an insert inner end extending into said male end, said insert inner end sealingly engaging said O-ring and having a rim engaging said annular shoulder; and an axial splined connection between said male end and said sleeve comprising a plurality of circumferentially spaced axial grooves and adjacent ridges in said male end inner periphery interfitting with axially extending portions of said tubular stem metal sleeve, said circumferentially spaced axial grooves astraddle said O-ring groove.

2. The male hose connector in claim 1 comprising: a collar receiving groove in said inner periphery, and said tubular stem metal sleeve having a crimped collar extending radially outwardly into said collar receiving groove.

3. The male hose connector in claim 1 wherein said sleeve is a stamping.

4. The male hose connector in 2 wherein said collar receiving groove intersects said spaced axial grooves and adjacent ridges.

5. The male hose connector in claim 1 comprising:
- a collar receiving groove in said periphery, and said sleeve having a crimped collar extending radially outwardly into said collar receiving groove;
- said O-ring groove intersecting said spaced axial grooves and adjacent ridges; and
- said collar receiving groove intersecting said spaced axial grooves and adjacent ridges.

* * * * *

UNITED STATES PATENT AND TRADEMARK OFFICE
CERTIFICATE OF CORRECTION

PATENT NO.    : 6,206,437 B1
DATED         : March 27, 2001
INVENTOR(S)   : James W. Humphreys It is certified that error appears in the above-identified patent and that said Letters Patent is hereby corrected as shown below:

<u>Column 4,</u>
Line 5, before "periphery" insert -- inner --.

Signed and Sealed this

Tenth Day of September, 2002

Attest:

Attesting Officer

JAMES E. ROGAN
*Director of the United States Patent and Trademark Office*